US012183195B2

(12) United States Patent
Crane et al.

(10) Patent No.: US 12,183,195 B2
(45) Date of Patent: Dec. 31, 2024

(54) DETERMINING RIGHT OF WAY

(71) Applicant: Zoox, Inc., Foster City, CA (US)

(72) Inventors: Robert Jonathan Crane, San Jose, CA (US); Joona Markus Petteri Kiiski, Cupertino, CA (US)

(73) Assignee: Zoox, Inc., Foster City, CA (US)

( * ) Notice: Subject to any disclaimer, the term of this patent is extended or adjusted under 35 U.S.C. 154(b) by 263 days.

(21) Appl. No.: 17/850,348

(22) Filed: Jun. 27, 2022

(65) Prior Publication Data
US 2023/0419830 A1 Dec. 28, 2023

(51) Int. Cl.
*B60W 30/18* (2012.01)
*B60W 40/04* (2006.01)
*B60W 40/06* (2012.01)
*B60W 60/00* (2020.01)
*G08G 1/0967* (2006.01)
*G08G 1/0968* (2006.01)
*G08G 1/0969* (2006.01)

(52) U.S. Cl.
CPC . *G08G 1/096725* (2013.01); *B60W 30/18159* (2020.02); *B60W 40/04* (2013.01); *B60W 60/0011* (2020.02); *B60W 60/0015* (2020.02); *G08G 1/096811* (2013.01); *G08G 1/0969* (2013.01); *B60W 2556/40* (2020.02); *B60W 2556/50* (2020.02)

(58) Field of Classification Search
CPC ....... G08G 1/096725; G08G 1/096811; G08G 1/0969; G08G 1/09623; B60W 30/18159; B60W 40/04; B60W 60/0011; B60W 60/0015; B60W 2556/40; B60W 2556/50
See application file for complete search history.

(56) References Cited

U.S. PATENT DOCUMENTS

| 11,161,502 | B2* | 11/2021 | Caldwell | G05D 1/0088 |
| 11,801,864 | B1* | 10/2023 | Arora | G06N 3/084 |
| 11,858,529 | B1* | 1/2024 | Costantino | B60W 40/02 |
| 2010/0060483 | A1* | 3/2010 | McNew | G08G 1/164 |
| | | | | 340/907 |
| 2019/0243371 | A1* | 8/2019 | Nister | G05D 1/65 |
| 2019/0291726 | A1* | 9/2019 | Shalev-Shwartz | |
| | | | | B60W 30/0956 |

(Continued)

FOREIGN PATENT DOCUMENTS

| CN | 113160547 A | 7/2021 |
| KR | 102333115 B1 | 11/2021 |

OTHER PUBLICATIONS

The PCT Search Report and Written Opinion mailed Oct. 12, 2023 for PCT application No. PCT/US23/25741, 13 pages.

*Primary Examiner* — Mussa A Shaawat
(74) *Attorney, Agent, or Firm* — Lee & Hayes, P.C.

(57) ABSTRACT

Techniques for determining right of way through an intersection are discussed herein. Routes through the intersection may be associated with respective priorities. The route associated with an inbound lane devoid of yield or stop markers may be determined as being associated with the highest priority. The hierarchy of the other priorities may be organized based on whether the number of times routes associated with each respective priority intersects the route associated with the highest priority. The routes and the priorities are saved in a data structure, and the data structure is transmitted to an autonomous vehicle for controlling the autonomous vehicle through the intersection.

20 Claims, 7 Drawing Sheets

(56) References Cited

U.S. PATENT DOCUMENTS

| | | | |
|---|---|---|---|
| 2020/0063667 A1* | 2/2020 | Lenk | F01M 11/10 |
| 2020/0312131 A1* | 10/2020 | Zhu | G08G 1/0116 |
| 2021/0101625 A1* | 4/2021 | Shrestha | B60W 60/0027 |
| 2021/0107396 A1* | 4/2021 | Omerbegovic | B60Q 1/0023 |
| 2021/0114617 A1* | 4/2021 | Phillips | B60W 30/0956 |
| 2021/0271249 A1* | 9/2021 | Kobashi | B60W 60/00272 |
| 2022/0204056 A1* | 6/2022 | Russell | B60W 60/00272 |
| 2022/0340137 A1* | 10/2022 | Ollis | B60W 30/09 |
| 2022/0340138 A1* | 10/2022 | Seegmiller | B60W 30/045 |
| 2022/0402485 A1* | 12/2022 | Kobilarov | B60W 60/00274 |

* cited by examiner

400

DETERMINING RIGHT OF WAY

BACKGROUND

Right of way through an intersection can be used to determine the order of vehicles traversing an intersection. In a controlled intersection, the right of way may generally be based on the order of vehicles traversing the intersection, such as first stop, first go. In a semi-controlled intersection or an uncontrolled intersection, the right of way may be more difficult to determine. While a driver in a non-autonomous vehicle or a semi-autonomous vehicle can determine in real time the right of way of the non-autonomous vehicle or the semi-autonomous vehicle, it may be difficult for an autonomous vehicle to determine its right of way through a semi-controlled intersection or an uncontrolled intersection.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
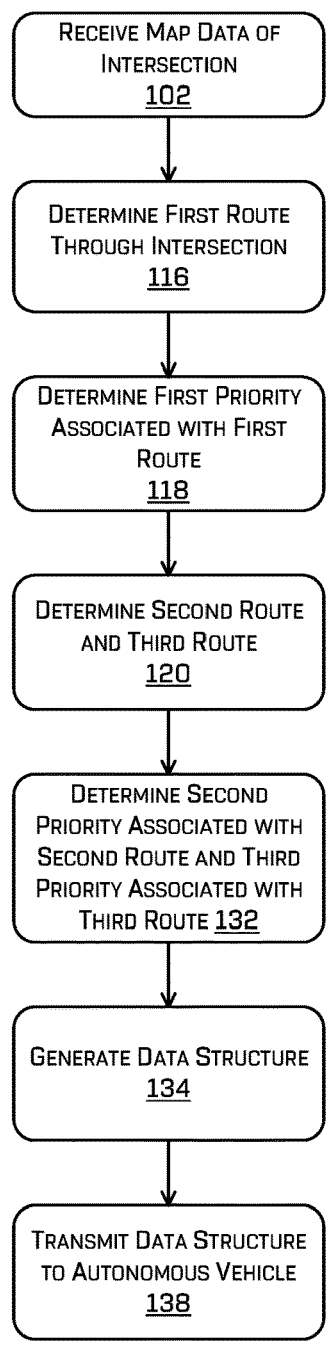
FIG. 1 is a pictorial flow diagram of an example process of determining right of way at a road intersection.
Figure 1:
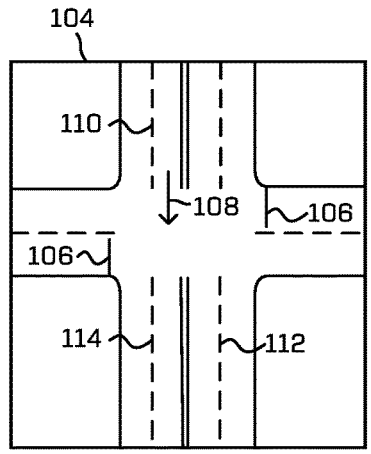
Figure 1:
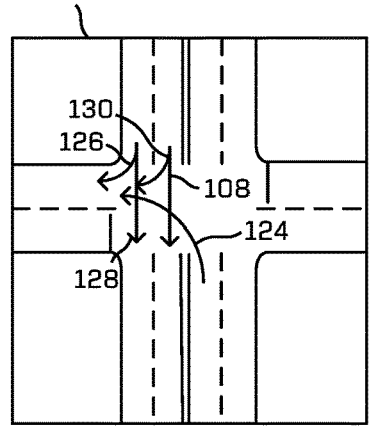
Figure 1:
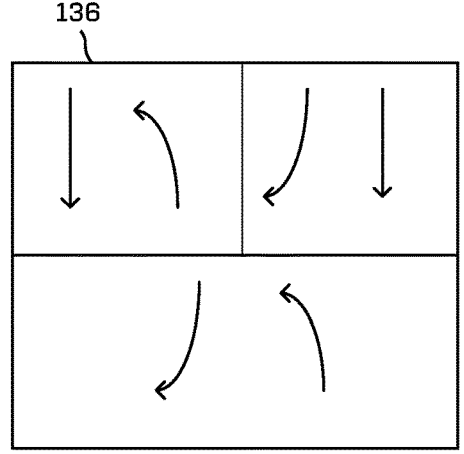

Techniques for determining right of way at a road intersection are discussed herein. For example, map data representing a road intersection in an environment may be received. In some examples, the map data can include traffic annotation data such stop signs, yield signs, traffic signals, or the like. In some examples, the techniques described herein can use the map data and traffic annotation data to identify routes that a objects such as vehicles (autonomous or otherwise), bicycles, and pedestrians may use to traverse the road intersection and the priorities (e.g., the right of way hierarchy) associated with those routes. In some examples, data associated with the routes and the associated priorities may be stored in a data structure, and sent to the vehicle. Accordingly, the vehicle can use the data structure to traverse the intersection while observing the proper right of way through the intersection.

In some examples, a road intersection may be a junction where two or more paths traversable by a pedestrian or a vehicle meet. Examples of road intersection may include, but are not limited to, a junction where an alley meets a road, a junction where a driveway meets a road, a four-way junction where two roads cross, a three-way junction where one road ends at another road, a junction where a bike path crosses a road, a junction such as a highway on ramp or off ramp where one road merges with another road, or the like. In some examples, the road intersection may be a controlled intersection, where all inbound traffic lanes associated with the road intersection have a traffic signal or traffic sign (e.g., traffic light, stop sign, yield sign, stop line, or the like). In some examples, the road intersection may be a semi-controlled intersection where less than all of the inbound traffic lanes associated with the road intersection have a traffic signal or traffic sign. In some examples, the road intersection may be an uncontrolled intersection where none of the inbound lane associated with the road intersection contain a traffic signal or traffic sign.

In some examples, data associated with the road intersection may be included in map data used by vehicle (autonomous or otherwise) to traverse an environment. In some examples, the map data may include data about the layout and geometry of the road intersection including, but not limited to, a shape of the intersection and all of the inbound lanes and outbound lanes associated with the intersection (e.g., vehicle lanes, pedestrian lanes, bike lanes, and the like), and the like. In some examples, the map data may further include traffic annotation data including, but not limited to, the traffic signals and the traffic signs, if any, associated with each inbound traffic lane of the road intersection.

In some examples, a computer system may receive the map data, and use the map data to determine routes through the road intersection. In various examples, such routes may comprise all possible and/or likely routes to be taken by a vehicle and any number of objects (e.g., other vehicles, pedestrians, etc.) proximate the vehicle approaching the intersection. In some examples, the computer system may associate each of the determined routes with a priority. In some examples, these priorities may be relative priorities. In some examples, these relative priorities may denote a right of way hierarchy associated with traversing the road intersection. For example, a first route through the road intersection may be associated with a first priority, a second route through the road intersection may be associated with a second priority, and a third route through the road intersection may be associated with a third priority where the first priority may have a higher relative priority to the second priority and third priority and the second priority may have a higher relative priority than the third priority. Such priorities may be assigned relatively (e.g., priorities are determined pairwise between the vehicle and the other objects) and/or absolutely (e.g., priorities are determined with respect to all objects, including the vehicle, at the intersection). In some examples, a route that a vehicle may traverse the road intersection with the highest relative priority (e.g., the first route and the first priority) may first be determined based on the traffic annotation data and data associated with the inbound lanes and outbound lanes associated with the road intersection. In some examples, other routes with lower relative priorities through the road intersection (e.g., the second route and the third route) may be subsequently determined using the map data. In some examples, the first priority, the second priority, and the third priority may be indicative of the right of way through the road intersection.

In some examples, the first route and the first priority may be determined as the route through the road intersection with the highest relative priority. In some examples, the first priority may be determined as having the highest relative priority when an inbound traffic lane associated the first route and an inbound traffic lane substantially parallel to the outbound traffic lane associated with the first route are both devoid of a traffic signal or a traffic marker such as, but not limited to a traffic light, a stop sign, a yield sign, a stop line, or the like. In some examples, once the first priority is determined as having the highest relative priority, the relative priorities associated with the second priority and the third priority may be determined based on the number of times the second route and the third route intersects the first route. For example, the second route may intersect the first route once and the third route may not intersect the first route, thereby the third route would have a higher relative priority than the second route. In this example, a vehicle traversing the first route will have the right of way over both a second vehicle traversing the second route and a third vehicle traversing the third route. The second vehicle traversing the second route would need to yield to the first vehicle and would have the right of way over the third vehicle. The third vehicle traversing the third route would need to yield to both the first vehicle and the second vehicle.

In some examples, the computer system may generate a data structure comprising the first route, the second route, the third route, the first priority, the second priority, and the third priority. In some examples the data structure may be a table containing multiple entries. In some examples, each entry may include a pairwise subset of all of the route through the road intersection and their associated priorities. For example, a first entry of the table may include the first route and the second route along with the first priority and the second priority. In some examples, the computer system may transmit the data structure to an autonomous vehicle. Alternatively, receiving the map data, determining the routes and the priorities, and generating the data structure may be performed on the autonomous vehicle rather than at a computer system external to the autonomous vehicle.

In some examples, the autonomous vehicle can use the data structure to traverse the road intersection. In some examples, the autonomous vehicle may use the data structure to determine the priority of its trajectory through the road intersection. In some examples, the autonomous vehicle may further determine that another vehicle is also traversing through the road intersection. In some examples, the autonomous vehicles may determine using logic, simulation, or a combination of both to determine whether the other vehicle and itself will intersect at the road intersection. In some examples, the autonomous vehicle may further compute a cost associated with yielding to the other vehicle or proceed through the road intersection without yielding, wherein the option with the lower cost is the one taken by the autonomous vehicle. As a non-limiting example, in a scenario in which an object is associated a route having a higher priority than a route associated with the vehicle, a cost may be incurred during optimizations for trajectory determination which penalizes the vehicle for determining trajectories which do not yield to the other object.

Techniques for determining right of way through a road intersection can improve the safety of vehicle operations and passenger safety as the vehicle traverses through the road intersection. In the context of determining the routes through the road intersection and priorities associated with the routes, such determinations assist the autonomous vehicle in determining its right of way when traversing the road intersection, and therefore, increases the safety of the autonomous vehicle and its passenger(s). In the context of the data structure, each entry being pairwise subset of all of the routes and the associated priorities assists in lowering the computational cost that the autonomous vehicle would need to use when determining its right of way through the road intersection. For example, when the autonomous vehicle determines that its trajectory intersects with a trajectory of another vehicle traversing the road intersection, the autonomous vehicle need only query the relevant entry in the data structure that contains the pairwise subset of its route through the intersection and the other vehicle's route through the road intersection. In the context of using costs to determine whether to yield or proceed through the road intersection without yielding can assists with prioritizing vehicle safety, passenger safety, passenger comfort, and the like. In some examples, vehicle safety, passenger safety, and passenger comfort may all be factors in assessing whether a cost of proceeding through the road intersection without yielding is high or low. For example, a vehicle may be able to traverse the road intersection safely at a high speed. However, the high speed may cause passenger discomfort. Therefore, the cost for proceeding through the intersection without yielding may be higher than the cost for yielding due to increased passenger discomfort, and the vehicle ultimately determines to yield at the road intersection.

The methods, apparatuses, and systems described herein may be implemented in a number of ways. Example implementations are provided below with reference to the following figures. Although discussed in the context of an autonomous vehicle, in some examples, the methods, apparatuses, and systems described herein may be applied to a variety of systems or vehicles, and is not limited to autonomous vehicles. In another example, the methods, apparatuses, and systems may be utilized in semi-autonomous or non-autonomous vehicles.

FIG. 1 illustrates an example process 100 of determining right of way at a road intersection.

At operation 102, a computing system and/or device may receive map data representing an intersection in an environment. Examples of the intersection may be, but are not limited to, a three-way road intersection, a four-way road intersection, an intersection between an alley and a road, an intersection between a driveway and a road, or the like. Example 104 illustrates an example map data of an intersection. Example 104 illustrates traffic markers 106, a first inbound lane 110, a second inbound lane 112, and an outbound lane 114. Examples of traffic markers may include, but are not limited to, a traffic signal, a stop sign, a yield sign, a stop line, or the like. In some examples, different types of traffic markers may have different relative traffic priorities. As non-limiting examples, inbound lanes associated with a yield sign may have higher priority than those associated a stop sign, whereas those lanes associated with a stop line and a stop sign may have the same traffic priority. In some examples, if all inbound lanes associated with the intersection are associated with stop signs and/or stop lines, thereby having the same priority, then the computer system and/or device may determine that the intersection is associated with a "first stop first go," or first-in-first-out (FIFO) scenario. In the "first stop first go" scenario, rather than determining the priority associated with each route, the computer system and/or device may determine that vehicles traversing the intersection would traverse the intersection in the order each arrives at the intersection. In some examples, on the traffic signal, the side of the traffic signal which displays a yellow light may have a higher priority than the side of the traffic signal which displays a red light. In those examples in which the vehicle and the object meet at the same time, rules of the road may be encoded or otherwise determined such that, for example, the object to the right has a higher priority. Of course, any other rule of the road or driving policy may be similarly encoded or determined.

In some examples, the first inbound lane 110, the second inbound lane 112, and the outbound lane 114 may be traffic lanes. In some examples, the second inbound lane 112 may be substantial parallel to the outbound lane 114, wherein a first vehicle may enter the intersection using the second inbound lane 112 in a first direction and a second vehicle may exit the intersection using the outbound lane 114 in a second direction opposite the first direction. In some examples, the second direction may be the direction denoted by the arrow associated with first route 108.

At operation 116, the computer system and/or device may determine a first route through the intersection. In some examples, the first route may be associated with a first priority. In some examples, the first route may be the route with a highest priority right of way, that is the first priority has the highest relative priority of all possible routes through the intersection. An example first route is illustrated as first route 108 in example 104. In some examples, the first route 108 may be associated with the first inbound lane 110 and the outbound lane 114. In some examples, a vehicle may use the first route 108 to traverse through the intersection from the first inbound lane 110 to the outbound lane 114. In some examples, the first route 108 may be associated with a first priority.

At operation 118, the computer system and/or device may determine the first priority associated with the first route 108. In some examples, the first priority may be determined as having the highest relative priority based on the second inbound lane 112 being devoid of any traffic markers such as traffic markers 106. Alternatively, in the event that all inbound lanes associated with the intersection are associated with a traffic marker, the first priority may be determined as having the highest relative priority based on the second inbound lane 112 being associated with a traffic marker associated with the highest traffic priority (e.g., the second inbound lane 112 is associated with a yield sign while other inbound lanes are associated with stop signs or stop lines). Alternatively or additionally, if the intersection contains a bike lane, then the bike lane may be associated with the highest relative priority. In such an example, the first priority may be associated with the second highest relative priority behind the priority associated with the bike lane.

At operation 120, once the first route and first priority are determined, the computer system and/or device may determine other routes through the intersection such as a second route 124 and a third route 126 illustrated in Example 122. Example 122 illustrates the same intersection as example 104. In some examples, the second route 124 may be a left turn through the intersection. In some examples, the third route 126 may be a right turn through the intersection in a same direction as the first route 108. In some examples, the second route 124 may be associated with a second priority. In some examples, the third route 126 may be associated with a third priority.

At operation 132, the computer system and/or device may determine the relative priorities of the second priority and the third priority. In some examples, the relative priorities may be determined based on the number of times each of the second route 124 and the third route 126 intersects the first route 108. As illustrated in example 122, the second route 124 intersects with the first route 108 once and the third route 126 does not intersects with the first route 108. Therefore, the second priority has a lower relative priority than the third priority. In this scenario, the rankings of the priorities are the first priority having the highest relative priority, the third priority has the second highest relative priority, and the second priority has the lowest relative priority.

In some examples, this logic can be extended to roads with three or more lanes. Example 122 further includes a fourth route 128 and a fifth route 130. In some examples, because the fourth route 128 is parallel to the first route 108 and is in a same direction as the first route 108, the fourth route 128 may also be associated with the first priority. In some examples, the fifth route 130 may be associated with a fourth priority. In some examples, because the fifth route 130 intersects with the fourth route 126 and the second route 124 intersects with both the first route 108 and the fourth route 126, the fourth priority has a higher relative priority than the second priority.

At operation 134, once the routes through the intersection and their associated priorities are determined, the computer system and/or device may generate a data structure storing the routes and the associated priorities. In some examples, the data structure may be a table (e.g., a right of way table). In some examples, each entry of the table may be a pairwise subset of all of the routes and the associated priorities. Example 136 illustrates an example right of way table with three example entries. Example 136 illustrates that the first entry (e.g., top left entry) may include the first route 108, the second route 124, the first priority, and the second priority. Example 136 illustrates that the second entry (e.g., top right entry) may include the third route 126, the first route 108, the third priority, and the first priority. Example 136 illustrates that the third entry (e.g., the bottom entry) may include the third route 126, the second route 124, the third priority, and the second priority. Additionally or alternatively, the data structure may include the traffic markers such as traffic markers 106 and the traffic priorities associated with those traffic markers. In some examples, the table may further include data associated with the "first stop first go" scenario.

At operation 138, the computer system and/or device may transmit the data structure to a vehicle (autonomous or otherwise) for controlling the vehicle to traverse through the intersection. In some examples, a planning component of the autonomous vehicle may utilize the data structure to control the autonomous vehicle through the intersection. Of course, though discussed above with respect to a precomputation being determined by a remote computing device, the techniques may equally be applied on a vehicle computing system. In at least some such examples, priorities may be determined based at least in part on a proposed trajectory or route associated with the vehicle and one or more possible transitions (e.g., all potential combinations of lane segments through the intersection) and/or predicted transitions (e.g., a subset of all possible transitions which may be output by a prediction model) associated with one or more objects proximate the vehicle entering the intersection.

Figure 2:
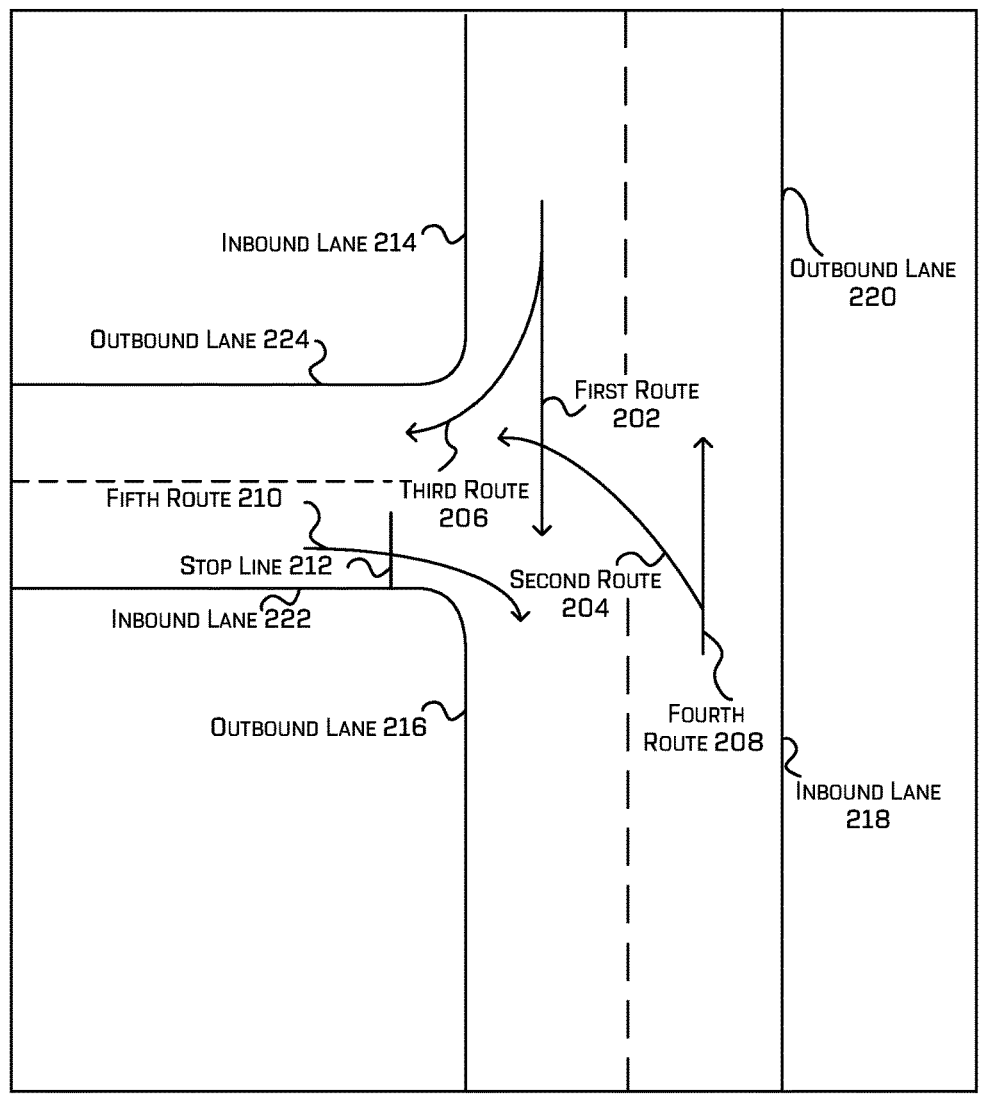
FIG. 2 is an illustration of example right of way scenarios at a three-way intersection.

FIG. 2 illustrates an example right of way scenario 200 at a three-way intersection. Example 200 includes a first route 202, a second route 204, a third route 206, a fourth route 208, a fifth route 210, a stop line 212, a first inbound lane 214, a first outbound lane 216, a second inbound lane 218, a second outbound lane 220, a third inbound lane 222, and a third outbound lane 224. In some examples, the first route 202 may be associated with a first priority, the second route 204 may be associated with a second priority, the third route 206 may be associated with a third priority, the fourth route 208 may be associated with a fourth priority, and the fifth route 210 may be associated with a fifth priority.

In some examples, first inbound lane 214 and the second inbound lane 218 are devoid of traffic markers. In some examples, the third inbound lane 222 may be associated with the stop line 212. In some examples, the first route 202 may be associated with the first inbound lane 214 and first outbound lane 216. In some examples, the second route 204 may be associated with the second inbound lane 218 and the third outbound lane 224. In some examples, the third route 206 may be associated with the first inbound lane 214 and the third outbound lane 224. In some examples, the fourth route 208 may be associated with the second inbound lane 218 and the second outbound lane 220. In some examples, the fifth route 210 may be associated with the third inbound lane 222 and first outbound lane 216.

In some examples, a route associated with the highest relative priority may be determined from the first route 202, the second route 204, the third route 206, the fourth route 208, the fifth route 210, and other possible routes through the intersection. Because the third inbound lane 222 is associated with the stop line 212, any route directly or indirectly associated with the third inbound lane 222 cannot be associated with the highest relative priority. In some examples, the fifth route 210 is directly associated with the third inbound lane 222 because the fifth route 210 enters the intersection using the third inbound lane 222. In some examples, the second route 204 and the third route 206 are indirectly associated with the third inbound lane 222 because both routes exit the intersection using the third outbound lane 224 opposite the third inbound lane 222. In some examples, the first route 202 may be determined as having the highest relative priority (e.g., the first priority is associated with the highest relative priority) because both the first inbound lane 214 and the second inbound lane 218 are devoid of traffic markers such as stop line 212. By that same logic, the fourth priority associated with the fourth route 208 would have the same highest relative priority as the first priority. In some examples, the computer system and/or device as described in association with FIG. 1 may be used to determine the route(s) with the highest relative priority. Additional details with respect to determining the highest relative priority are discussed in connection with FIG. 1, as well as throughout this disclosure.

In some examples, relative priorities associated with the second route 204, the third route 206, and the fifth route 210 (e.g., the second priority, the third priority, and the fifth priority) may be determined. In some examples, the relative priorities may be determined based on the number of times the second route 204, the third route 206, and the fifth route 210 intersects the first route 202 and/or the fourth route 208. As describe in association with FIG. 1, the priority associated with the route with the least amount of intersection with the first route 202 and/or the fourth route 208 may have the highest relative priority of the second route 204, the third route 206, and the fifth route 210. In some examples, a route associated with an inbound lane associated with a traffic marker may have a lower relative priority to a route associated with an inbound lane devoid of any traffic markers. As illustrated in example 200, the third priority associated with the third route 206 has a higher relative priority than the second priority associated with the second route 204 because the third route 206 does not intersect with either the first route 202 or the fourth route 208 while the second route 204 intersects with the first route 202. Furthermore, the fifth priority associated with the fifth route 210 has a lower relative priority to both the second priority and the third priority because the third inbound lane 222 is associated with the stop line 212 while both the first inbound lane 214 and the second inbound lane 218 are devoid of any traffic markers. In some examples, the computer system and/or device as described in association with FIG. 1 may be used to determine the relative priorities of the second route, the third route, and the fifth route. Additional details with respect to determining these relative priorities are discussed in connection with FIG. 1, as well as throughout this disclosure.

Figure 3:
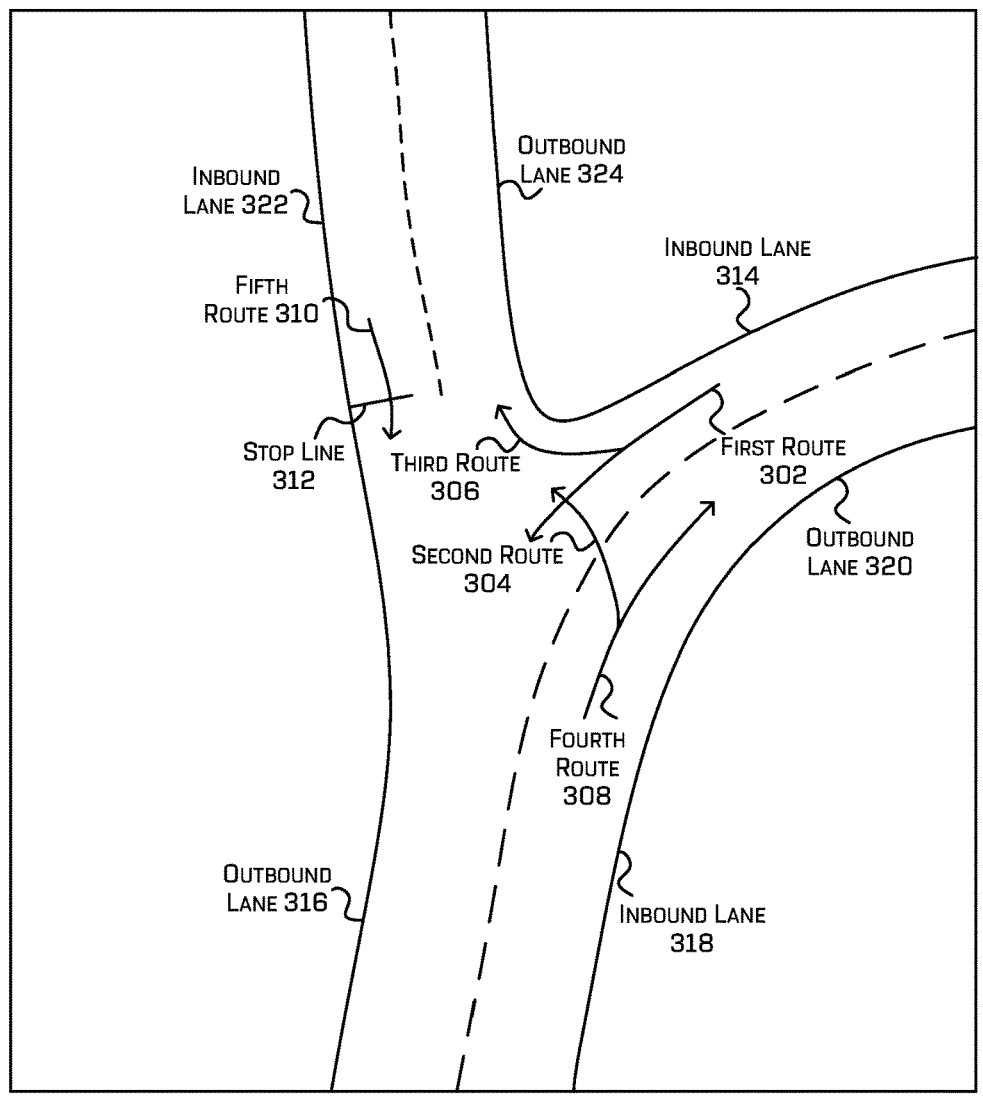
FIG. 3 is an illustration of example right of way scenarios at an alternate three-way intersection.

FIG. 3 illustrates an example right of way scenario 300 at an alternate three-way intersection. Example 300 includes a first route 302, a second route 304, a third route 306, a fourth route 308, a fifth route 310, a stop line 312, a first inbound lane 314, a first outbound lane 316, a second inbound lane 318, a second outbound lane 320, a third inbound lane 322, and a third outbound lane 324. In some examples, the first route 302 may be associated with a first priority, the second route 304 may be associated with a second priority, the third route 306 may be associated with a third priority, the fourth route 308 may be associated with a fourth priority, and the fifth route 310 may be associated with a fifth priority.

In some examples, first inbound lane 314 and the second inbound lane 318 are devoid of traffic markers. In some examples, the third inbound lane 322 may be associated with the stop line 312. In some examples, the first route 302 may be associated with the first inbound lane 314 and first outbound lane 316. In some examples, the second route 304 may be associated with the second inbound lane 318 and the third outbound lane 324. In some examples, the third route 306 may be associated with the first inbound lane 314 and the third outbound lane 324. In some examples, the fourth route 308 may be associated with the second inbound lane 318 and the second outbound lane 320. In some examples, the fifth route 310 may be associated with the third inbound lane 322 and first outbound lane 316.

In some examples, a route associated with the highest relative priority may be determined from the first route 302, the second route 304, the third route 306, the fourth route 308, the fifth route 310, and other possible routes through the intersection. Because the third inbound lane 322 is associated with the stop line 312, any route directly or indirectly associated with the third inbound lane 322 cannot be associated with the highest relative priority. In some examples, the fifth route 310 is directly associated with the third inbound lane 322 because the fifth route 310 enters the intersection using the third inbound lane 322. In some examples, the second route 304 and the third route 306 are indirectly associated with the third inbound lane 322 because both routes exits the intersection using the third outbound lane 324 opposite the third inbound lane 322. In some examples, the first route 302 may be determined as having the highest relative priority (e.g., the first priority is associated with the highest relative priority) because both the first inbound lane 314 and the second inbound lane 318 are devoid of traffic markers such as stop line 312. By that same logic, the fourth priority associated with the fourth route 308 would have the same highest relative priority as the first priority. In some examples, the computer system and/or device as described in association with FIG. 1 may be used to determine the route(s) with the highest relative priority. Additional details with respect to determining the highest relative priority are discussed in connection with FIG. 1, as well as throughout this disclosure.

In some examples, relative priorities associated with the second route 304, the third route 306, and the fifth route 310 (e.g., the second priority, the third priority, and the fifth priority) may be determined. In some examples, the relative priorities may be determined based on the number of times the second route 304, the third route 306, and the fifth route 310 intersects the first route 302 and/or the fourth route 308.

As describe in association with FIG. 1, the priority associated with the route with the least amount of intersection with the first route 302 and/or the fourth route 308 may have the highest relative priority of the second route 304, the third route 306, and the fifth route 310. In some examples, a route associated with an inbound lane associated with a traffic marker may have a lower relative priority to a route associated with an inbound lane devoid of any traffic markers. As illustrated in example 300, the third priority associated with the third route 306 has a higher relative priority than the second priority associated with the second route 304 because the third route 306 does not intersect with either the first route 302 or the fourth route 308 while the second route 304 intersects with the first route 302. Furthermore, the fifth priority associated with the fifth route 310 has a lower relative priority to both the second priority and the third priority because the third inbound lane 322 is associated with the stop line 312 while both the first inbound lane 314 and the second inbound lane 318 are devoid of any traffic markers. In some examples, the computer system and/or device as described in association with FIG. 1 may be used to determine the relative priorities of the second route 304, the third route 306, and the fifth route 310. Additional details with respect to determining these relative priorities are discussed in connection with FIG. 1, as well as throughout this disclosure.

Figure 4:
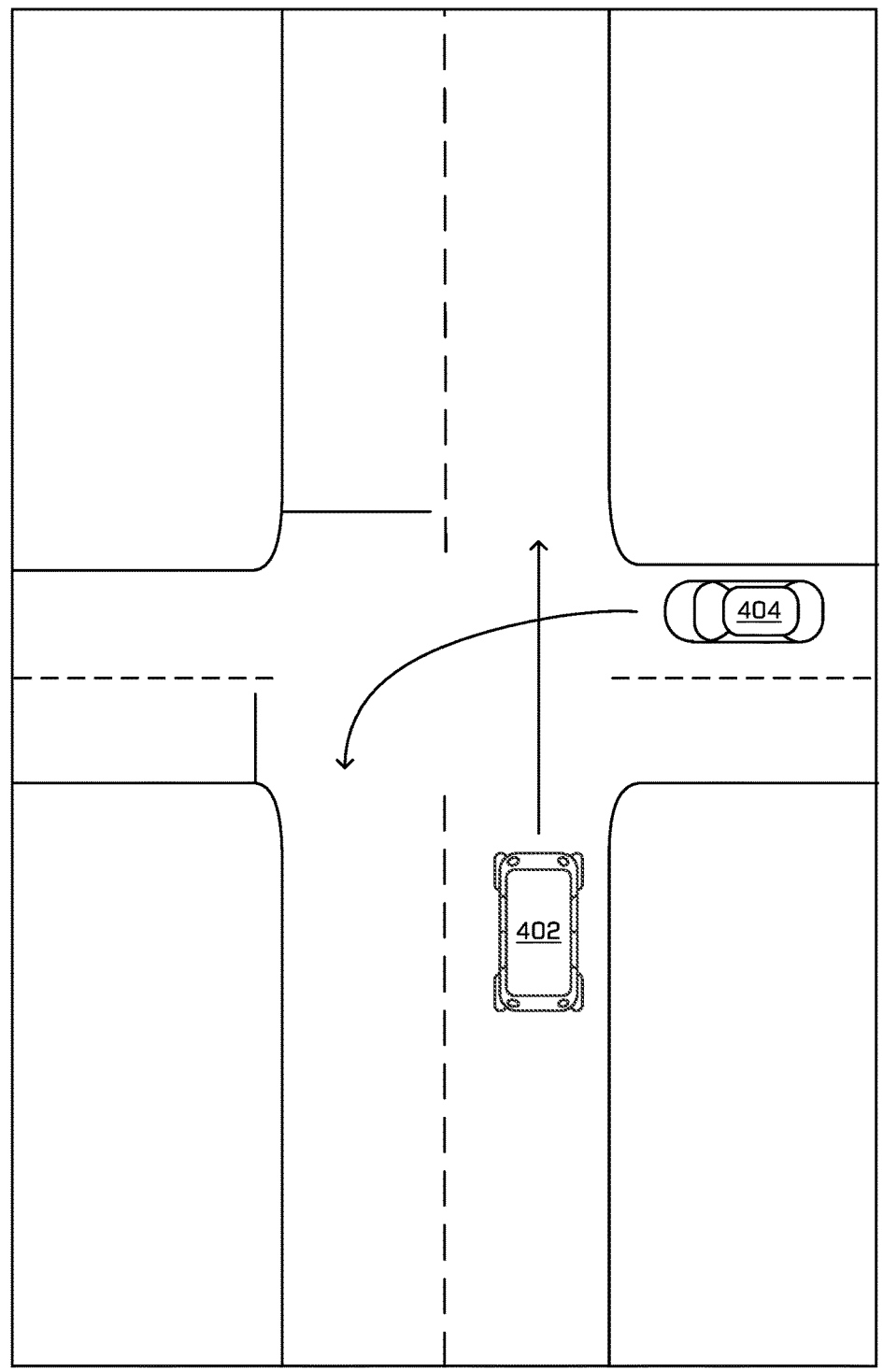
FIG. 4 is an illustration of an example of an autonomous vehicle operating a right of way scenario at a four-way intersection.

FIG. 4 illustrates an example 400 of an autonomous vehicle operating a right of way scenario at a four-way intersection. Example 400 includes an autonomous vehicle 402 and a vehicle 404. The autonomous vehicle 402 has a trajectory of heading straight through the intersection while the vehicle 404 has a left turn trajectory through the intersection that intersects with the autonomous vehicle 402's trajectory. In example 400, the trajectory associated with the vehicle 404 has a higher priority than the trajectory associated with the autonomous vehicle 402 because the inbound lane associated that trajectory is devoid of any traffic marker and the inbound lane opposite the outbound lane associated with that trajectory (e.g., the inbound lane that autonomous vehicle 402 uses to enter the intersection) is also devoid of any traffic marker. Additional details with respect to determining these relative priorities are discussed in connection with FIG. 1, as well as throughout this disclosure. In addition to determining the relative priorities of the vehicle trajectories, the vehicle 402 can further determine whether to yield to the vehicle 404 based on logic, simulation, or a combination of logic and simulation along with the cost of yielding versus the cost of proceeding through the intersection without yielding. Additional details with respect to determining whether to yield to the vehicle 404 are discussed in connection with FIG. 5, as well as throughout this disclosure.

Figure 5:
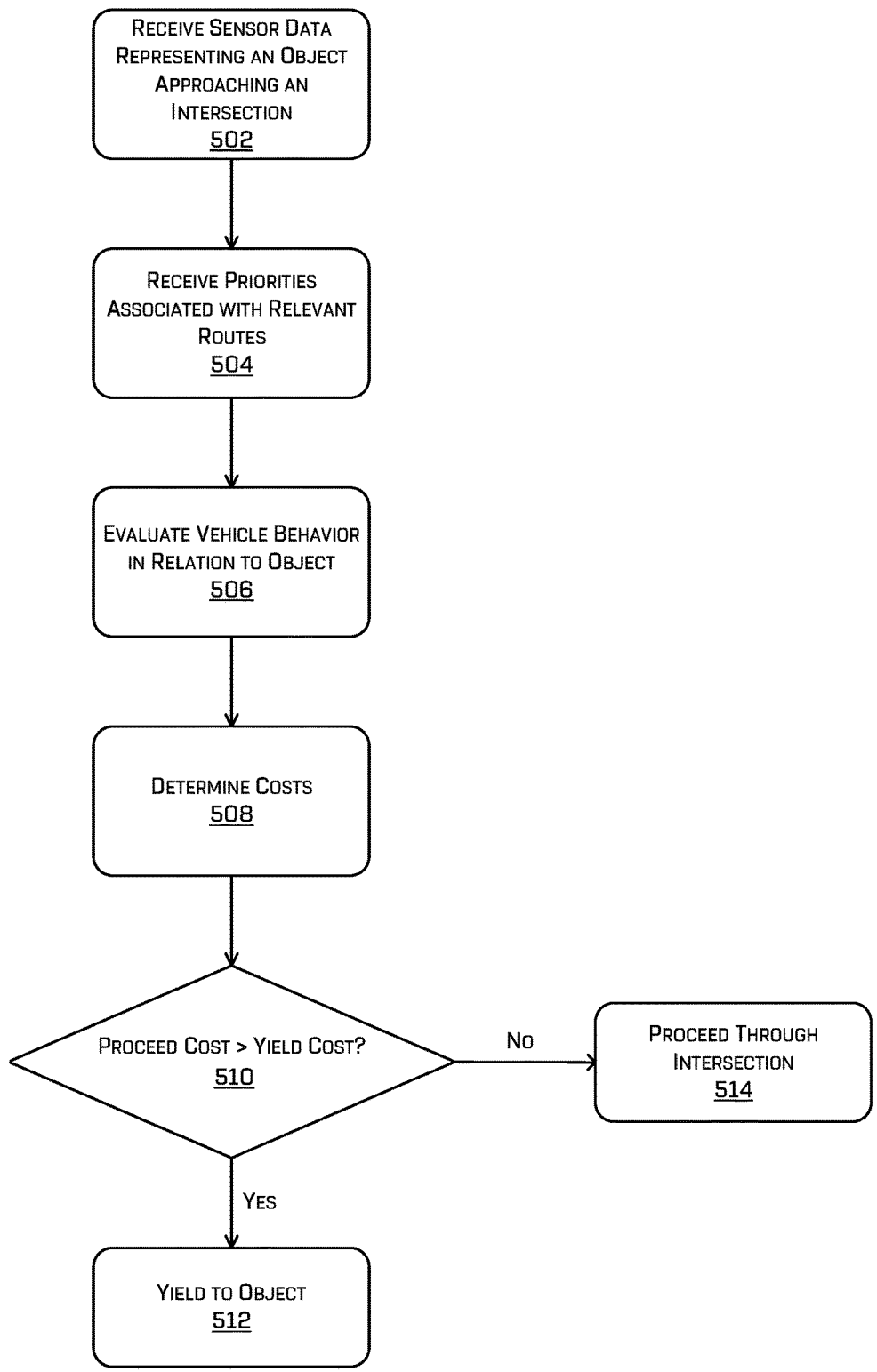
FIG. 5 is an example process of an autonomous vehicle operationally determining its right of way at a road intersection.

FIG. 5 illustrates an example process 500 of an autonomous vehicle operationally determining its right of way at a road intersection. FIG. 5 illustrates an example process in accordance with examples of the disclosure. This example process is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

At operation 502, the autonomous vehicle may receive sensor data representing an object approaching an intersection. For example, as illustrated in FIG. 4, the autonomous vehicle 402 may receive sensor data representing the vehicle 404 approaching the intersection. In some examples, the operation 502 can include receiving data from a sensor disposed on a vehicle or remote to the vehicle (e.g., from a remote sensor, another vehicle, and the like).

At operation 504 the autonomous vehicle may receive priorities associated with relevant routes. In some examples, a planner component of the autonomous vehicle may be receiving the priorities from an entry of a data structure that includes the relevant routes associated with a trajectory associated with the autonomous vehicle and a trajectory associated with the object. For example, with reference to FIG. 4, the entry may include a first route associated with the trajectory of the vehicle 404, a second route associated with the trajectory of the autonomous vehicle 402, a first priority associated with the first route, a second priority associated with the second route, and traffic priorities associated with traffic markers associated with the first route and/or the second route. Additional details with respect to the autonomous vehicle receiving data from the data structure are discussed in connection with FIG. 1, as well as throughout this disclosure.

At operation 506, the autonomous vehicle may evaluate its behavior in relation to the object. In some examples, the autonomous vehicle may evaluate its behavior based on the data structure including the various priorities and traffic priorities. In some examples, the autonomous vehicle may evaluate its behavior using logic. In some examples, the logic may include decisions such as, but are limited to, determining whether the object is within a threshold distance, whether the trajectory associated with the object has priority over the trajectory of the autonomous vehicle and whether the two trajectories intersect, whether the speed of the object is greater than a threshold speed, and the like. In some examples, the autonomous vehicle may evaluate its behavior based on results from simulation. In some examples, the autonomous vehicle may evaluate its behavior based on a combination of logic and simulation.

At operation 508, the autonomous vehicle may determine costs. In some examples, the autonomous vehicle can determine a first cost associated with yielding to the object and a second cost associated with proceeding through the intersection without yielding. The factors contributing to each cost may include, but are not limited to, whether the trajectory associated with the autonomous vehicle has priority over the trajectory associated with the object, whether evaluating the behavior of the autonomous vehicle at operation 506 weighs toward yielding or proceeding, passenger comfort, and the like. For example, operation 506 may indicate that the autonomous vehicle can safely proceed through the intersection without yielding; however, the speed at which the autonomous vehicle needs to safely proceed through the intersection without yielding may be faster than what is comfortable for a passenger. As a result, in the interest of passenger comfort, the first cost associate with yielding may be low and the second cost associated with proceeding may be high.

At operation 510, the autonomous vehicle may determine whether the second cost associated with proceeding is greater than the first cost associated with yielding. If yes, then the autonomous vehicle proceeds to operation 512 and yield to the object prior to proceeding through the intersection. If no, then the autonomous vehicle proceeds to operation 514 and proceeds through the intersection without yielding to the object.

Of course, though depicted in operations 510 through 514 as a simple determination process for illustrative purposes, use of priorities in trajectory generation may be more nuanced and complex. For instance, the cost determined in operation 508 may be one of several costs including progression costs (e.g., a cost incurred for deviating from a desired position), a safety cost (penalizing approaching objects too closely), comfort costs, and the like. All such costs may be evaluated jointly in determining an optimized trajectory for the vehicle to follow as may discussed herein, as well as disclosed in U.S. Pat. No. 11,161,502 entitled "Cost-Based Path Determination," filed on Aug. 13, 2019, the entire contents of which are hereby incorporated by reference.

Figure 6:
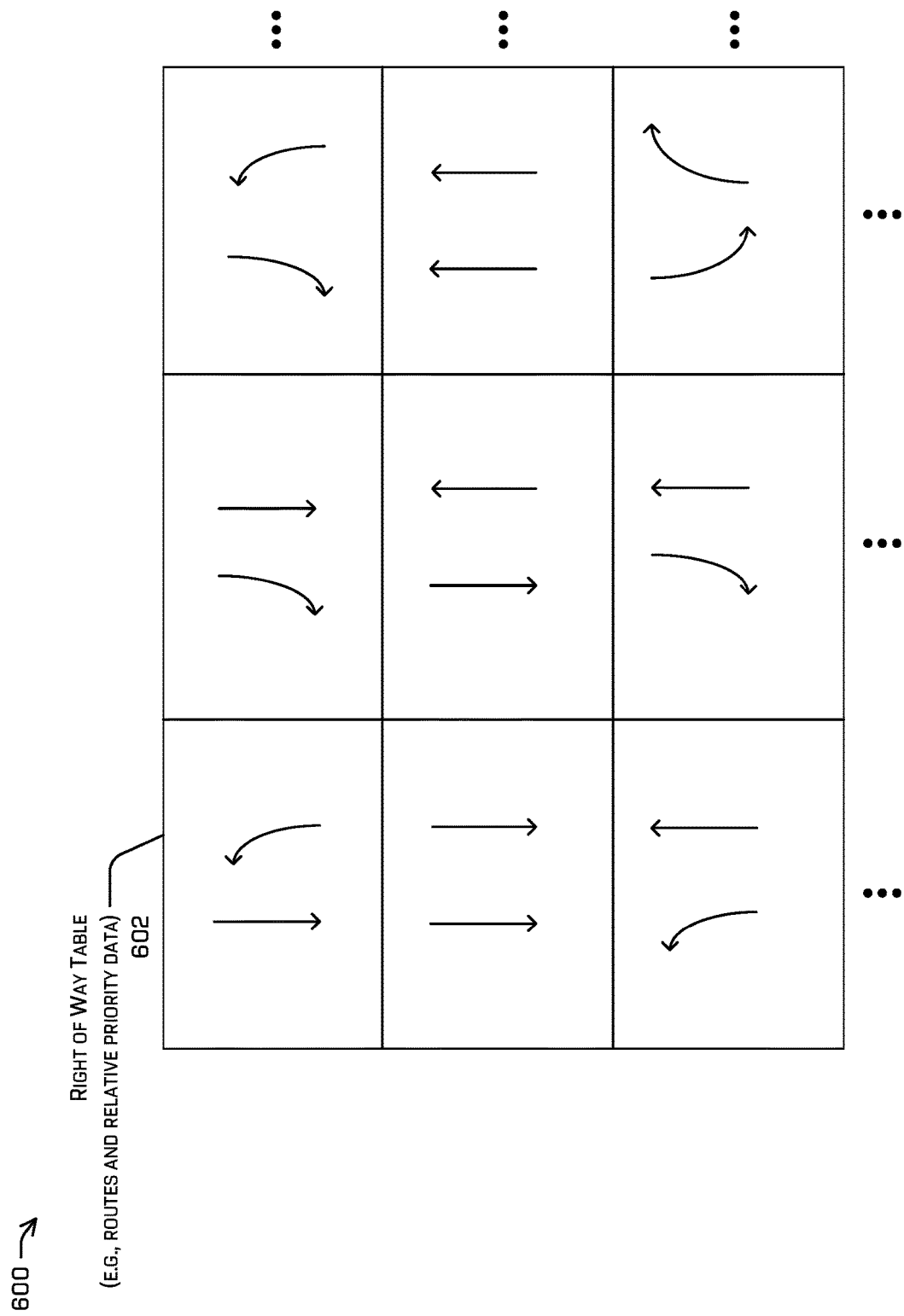
FIG. 6 is an illustration of an example data structure.

FIG. 6 illustrates an example data structure 600. In example 600, the data structure may be a right of way table 602. The right of way table 602 may be similar or same as the data structure described in association with FIG. 1. In some examples, the right of way table 602 may include a plurality of entries. In some examples, each entry of the plurality of entries may include a pairwise subset of all of the routes and their associated priorities. In some examples, the priorities include relative priority data of each of the priorities. The pairwise subsets for each entry are illustrated in each of the nine entries. Although the right of way table 602 illustrates only nine entries, it can be appreciated that the right of way table 602 may include scores, hundreds, or thousands of entries or as many entries as necessary to illustrate all possible pairings of routes through the intersection, as well as all semantic information associated with the various combinations (e.g., bicycle lane indications, traffic signals and control devices, presence of cross walks, etc.).

Figure 7:
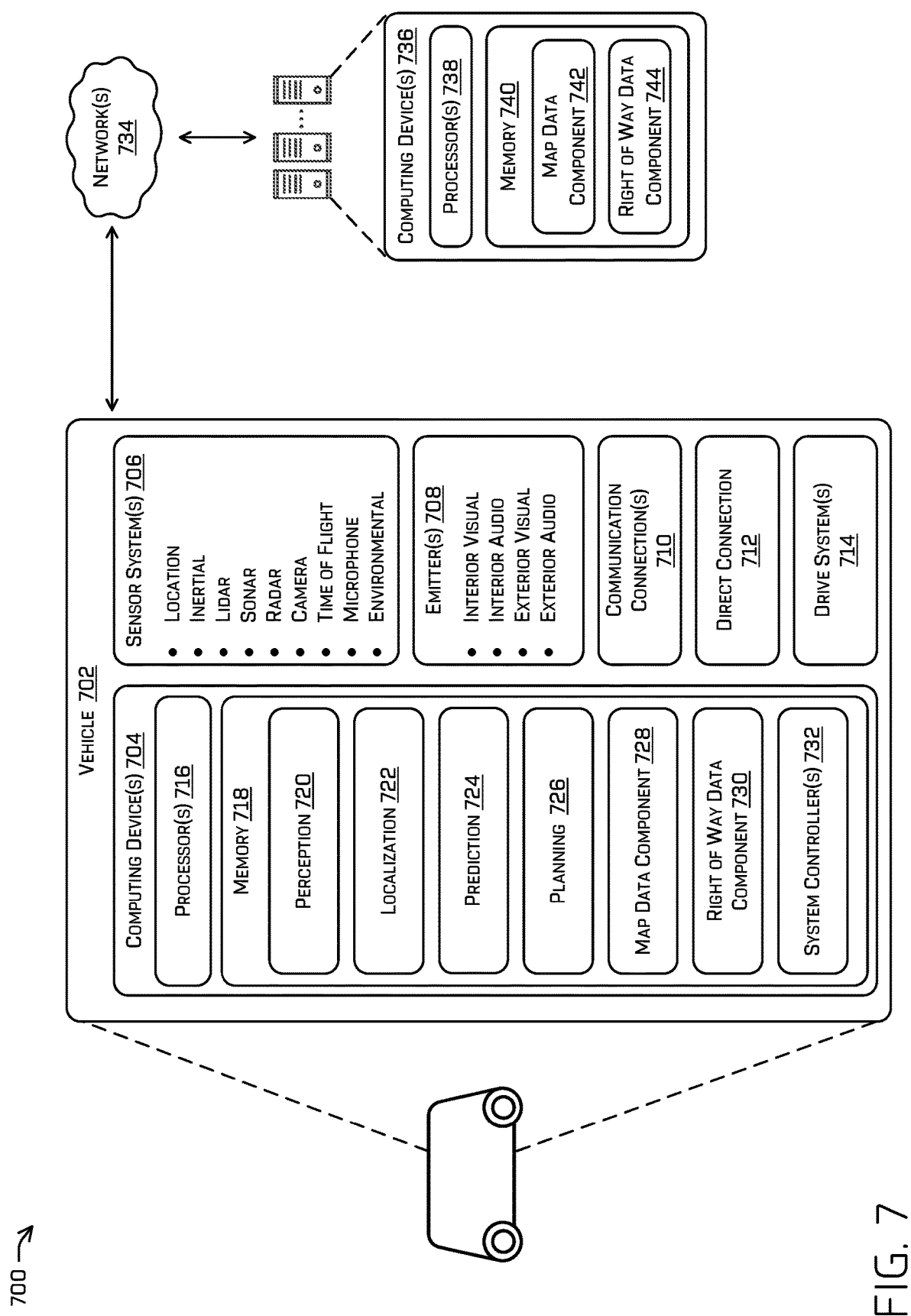
FIG. 7 includes a block diagram of an example architecture of a vehicle control system and a computing system for determining the right of way, as described herein.

FIG. 7 illustrates an example computing environment 700 that may be used to implement the driving simulation systems according to the techniques described herein. The computing environment 700 may include a computing device 736 and a vehicle control system 702. In this example, the computing device 736 may determine the routes and associated priorities through an intersection and generate a data structure comprising the routes and the associated priorities to assist an autonomous vehicle to determine the right way through the intersection such as those described in process 100. The components of computing device 736 may be implemented within a single computing system, as in this example, or may be implemented in separate computer systems.

The vehicle control system 702 may include various software-based and/or hardware-based components of an autonomous vehicle, and may be used to control autonomous vehicles traversing through physical environments and/or simulated vehicles operating within virtual and/or log-based driving simulations. The vehicle control system 702 may be similar or identical to a vehicle control system of the autonomous vehicle 402 as well as any simulated autonomous vehicles in simulation.

In this example, the vehicle control system 702 and the computing device 736 are illustrated as discrete computing systems communicating over one or more networks 734, although in other implementations the functionality of each of the systems 702, 736, may be carried out in the same computing environment. By way of non-limiting example, software executing the functionality of the vehicle control system 702 may be uploaded or otherwise incorporated into the computing device 736 and/or software executing the computing device 736 may be uploaded to or otherwise made incorporated into the vehicle control system 702.

The vehicle control system 702 can be a hardware-based and/or software-based controller for a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In some instances, the vehicle control system 702 may operate within a real associated vehicle, such as a fully or partially autonomous vehicle having any other level or classification. In some instances, the techniques described herein may be usable by non-autonomous vehicles as well. Additionally and/or alternatively, the vehicle control system 702 may operate independently from any vehicle, for example, as a hardware and software-based controller for a simulated vehicle executing in a computing environment during the development, testing, and validation processes for the vehicle control system 702. In addition, while implementations of the vehicle control system 702 described herein may include simulating a control system of an autonomous vehicle, semi-autonomous vehicle, or a non-autonomous vehicle, some of the techniques may be in a simulated environment, using a simulated vehicle.

The vehicle control system 702 can be used for any configuration of real or simulated vehicles, such as, for example, a van, a sport utility vehicle, a cross-over vehicle, a truck, a bus, an agricultural vehicle, and/or a construction vehicle. For instance, the associated vehicle for the vehicle control system 702 can be powered by one or more internal combustion engines, one or more electric motors, hydrogen power, any combination thereof, and/or any other suitable power sources. Although the associated vehicle may have four wheels, the vehicle control system 702 and associated techniques described herein can be incorporated into vehicles having fewer or a greater number of wheels, and/or tires. The vehicle control system 702 can control vehicles having four-wheel steering and can operate generally with equal or similar performance characteristics in all directions, for example, such that a first end of the vehicle is the front end of the vehicle when traveling in a first direction, and such that the first end becomes the rear end of the vehicle when traveling in the opposite direction. Similarly, a second end of the vehicle is the front end of the vehicle when traveling in the second direction, and such that the second end becomes the rear end of the vehicle when traveling in the opposite direction. These example characteristics may facilitate greater maneuverability, for example, in small spaces or crowded environments, such as parking lots and/or urban areas.

The vehicle control system 702 can include a computing device(s) 704, one or more sensor system(s) 706, one or more emitter(s) 708, one or more communication connection(s) 710 (also referred to as communication devices and/or modems), at least one direct connection 712 (e.g., for physically coupling with the vehicle to exchange data and/or to provide power), and one or more drive system(s) 714. The one or more sensor system(s) 706 can be configured to capture sensor data associated with an environment.

The sensor system(s) 706 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, TR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 706 can include multiple instances of each of these or other types of sensors. For instance, the time-of-flight sensors can include individual time-of-flight sensors located at the corners, front, back, sides, and/or top of the real or simulated vehicle associated with the vehicle control system 702. As another example, the camera sensors can include multiple cameras disposed at various locations about the exterior and/or interior of the associated real or simulated vehicle. The sensor system(s) 706 can provide input to the computing device(s) 704.

The vehicle control system 702 can also include one or more emitter(s) 708 for controller the emitting of light and/or sound via the real or simulated vehicle associated with the vehicle control system 702. The one or more emitter(s) 708 in this example include interior audio and visual emitters to communicate with passengers of the vehicle. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 708 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle control system 702 can also include one or more communication connection(s) 710 that enable communication between the vehicle control system 702 and one or more other local or remote computing device(s) (e.g., a remote teleoperations computing device) or remote services. For instance, the communication connection(s) 710 can facilitate communication with other local computing device(s) on the associated real or simulated vehicle, and/or the drive system(s) 714. Also, the communication connection(s) 710 can allow the vehicle to communicate with other nearby computing device(s) (e.g., other nearby vehicles, traffic signals, etc.).

The communications connection(s) 710 can include physical and/or logical interfaces for connecting the computing device(s) 704 to another computing device or one or more external networks 734 (e.g., the Internet). For example, the communications connection(s) 710 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s). In at least some examples, the communication connection(s) 710 may comprise the one or more modems as described in detail above.

In at least one example, the vehicle control system 702 can include one or more drive system(s) 714. In some examples, the real or simulated vehicle associated with the vehicle control system 702 can have a single drive system 714. In at least one example, if the vehicle has multiple drive systems 714, individual drive systems 714 can be positioned on opposite ends of the associated vehicle (e.g., the front and the rear, etc.). In at least one example, the drive system(s) 714 can include one or more sensor system(s) 706 to detect conditions of the drive system(s) 714 and/or the surroundings of the vehicle. By way of example and not limitation, the sensor system(s) 706 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 714. In some cases, the sensor system(s) 706 on the drive system(s) 714 can overlap or supplement corresponding systems of the vehicle control system 702 (e.g., sensor system(s) 706).

The drive system(s) 714 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 714 can include a drive system controller which can receive and preprocess data from the sensor system(s) 706 and to control operation of the various vehicle systems. In some examples, the drive system controller can include one or more processor(s) and memory communicatively coupled with the one or more processor(s). The memory can store one or more modules to perform various functionalities of the drive system(s) 714. Furthermore, the drive system(s) 714 also include one or more communication connection(s) that enable communication by the respective drive system with one or more other local or remote computing device(s).

The computing device(s) 704 within the vehicle control system 702 can include one or more processor(s) 716 and memory 718 communicatively coupled with the one or more processor(s) 716. In the illustrated example, the memory 718 of the computing device(s) 704 stores a perception component 720, a localization component 722, a prediction component 724, a planning component 726, a map data component 728, a right of way data component 730, and one or more system controller(s) 732. Though depicted as residing in the memory 718 for illustrative purposes, it is contemplated that the perception component 720, the localization component 722, the prediction component 724, the planning component 726, the map data component 728, the right of way data component 730, and the one or more system controller(s) 732 can additionally, or alternatively, be accessible to the computing device(s) 704 (e.g., stored in a different component of vehicle control system 702 and/or stored remotely and accessible to the vehicle control system 702.

In memory 718 of the computing device(s) 704, the perception component 720 can include functionality to perform object detection, segmentation, and/or classification. In some examples, the perception component 720 can provide processed sensor data that indicates a presence of an entity that is proximate to the real or simulated vehicle associated with the vehicle control system 702 and/or a classification of the entity as an entity type (e.g., car, pedestrian, cyclist, building, tree, road surface, curb, sidewalk, unknown, etc.). In additional and/or alternative examples, the perception component 720 can provide processed sensor data that indicates one or more characteristics associated with a detected entity and/or the real or simulated environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

The perception component 720 can include functionality to store perception data generated by the perception component 720. In some instances, the perception component 720 can determine a track corresponding to an object that has been classified as an object type. For purposes of illustration only, the perception component 720, using sensor system(s) 706 can capture one or more images of a real or simulated environment. The sensor system(s) 706 can capture images of an environment that includes an object, such as a pedestrian. The pedestrian can be at a first position at a time T and at a second position at time T+t (e.g., movement during a span of time t after time T). In other words, the pedestrian can move during this time span from the first position to the second position. Such movement can, for example, be logged as stored perception data associated with the object.

The stored perception data can, in some examples, include fused perception data captured by the vehicle. Fused perception data can include a fusion or other combination of sensor data from sensor system(s) 706, such as image sensors, lidar sensors, radar sensors, time-of-flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include a track data (positions, orientations, sensor features, etc.) corresponding to motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

The localization component 722 can include functionality to receive data from the sensor system(s) 706 to determine a position of the real or simulated vehicle associated with the vehicle control system 702. For example, the localization component 722 can include and/or request/receive a three-dimensional map of the real or simulated environment and can continuously determine a location of the autonomous vehicle within the map. In some instances, the localization component 722 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 722 can provide data to various components of the vehicle control system 702 to determine an initial position of an autonomous vehicle for generating a trajectory, as discussed herein.

The prediction component 724 can generate one or more probability maps representing prediction probabilities of possible locations of one or more objects in a real or simulated environment. For example, the prediction component 724 can generate one or more probability maps for vehicles, pedestrians, animals, and the like within a threshold distance from the vehicle associated with the vehicle control system 702. In some instances, the prediction component 724 can measure a track of an object and generate a discretized prediction probability map, a heat map, a probability distribution, a discretized probability distribution, and/or a trajectory/trajectories for the object based on observed and predicted behavior. In some instances, the one or more probability maps can represent an intent of the one or more objects in the environment.

The planning component 726 can determine a path for the vehicle control system 702 to direct the real or simulated vehicle through an environment. For example, the planning component 726 can determine various routes and paths and various levels of detail. In some instances, the planning component 726 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 726 can generate an instruction for guiding the autonomous vehicle along at least a portion of the route from the first location to the second location. In at least one example, the planning component 726 can determine how to guide the autonomous vehicle from a first waypoint in the sequence of waypoints to a second waypoint in the sequence of waypoints. In some examples, the instruction can be a path, or a portion of a path, and/or various positions, orientations, velocities, headings, steering angles, accelerations, torques, etc. associated with the one or more waypoints. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 726 can alternatively, or additionally, use data from the perception component 720 to determine a path for the real or simulated vehicle associated with the vehicle control system 702 to follow to traverse through an environment. For example, the planning component 726 can receive data from the perception component 720 regarding objects associated with an environment. Using this data, the planning component 726 can determine a route to travel from a first location (e.g., a current location) to a second location (e.g., a target location) to avoid objects in an environment. In at least some examples, such a planning component 726 may determine there is no such collision free path and, in turn, provide a path which brings the vehicle to a safe stop avoiding all collisions and/or otherwise mitigating damage.

In some examples, the planning component 726 can further use map data from the map data component 728 and the right of way data from the right of way data component 730 to determine whether the vehicle 702's right of way through an intersection as described in association with FIGS. 1-5, as well as throughout this disclosure. In some examples, the map data component 728 and the right of way data component 730 may be transmitted by the computing device 736 using the network 734 from a map data component 742 and a right of way data component 744.

Computing device 736 may include one or more processors 738 and memory 740 communicatively coupled with the one or more processors 738. In the illustrated example, the memory 740 of the computing device 736 stores the map data component 742 and the right of way data component 744. In some examples, the map data component 742 and the right of way data component 744 may include the same data as the map data component 728 and the right of way data component 730 respectively. In some examples, the computing device 736 may use map data from map data component 742 to generate right of way data of right of way data component 744 as described in association with FIGS. 1-4, as well as throughout this disclosure. Though depicted in FIG. 7 as residing in the memory 740 for illustrative purposes, it is contemplated that some or all of the systems and components 742 and 744 may additionally, and/or alternatively, be stored remotely and accessible to the computing device 736 through networks 734.

The processor(s) 716 of the computing device(s) 704 and the processor(s) 738 of the computing device 736 can be any suitable processor capable of executing instructions to process data and perform operations as described herein. By way of example and not limitation, the processor(s) 716 and 738 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 718 of the computing device(s) 704, and the memory 740 of the computing device 736 are examples of non-transitory computer-readable media. The memory 718 and 740 can store an operating system and one or more software applications, instructions, programs, and/or data to implement the methods described herein and the functions attributed to the various systems. In various implementations, the memory 718 and 740 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, any or all of the components within the memory 718 and memory 740 can be implemented as a neural network.

EXAMPLE CLAUSES

A: A system comprising: one or more processors; and one or more non-transitory computer-readable media storing computer-executable instructions that, when executed, cause the one or more processors to perform operations comprising: receiving map data representing a road intersection in an environment having an inbound traffic lane and an outbound traffic lane, the map data comprising traffic annotation data; determining, based at least in part on the map data, a first route and a second route through the road intersection; determining a number of times that the second route intersects the first route; determining, based at least in part on the number of times and the traffic annotation data, a relative priority between the first and second routes; storing, in a data structure, an association between the first route, the second route, the traffic annotation data, and the relative priority; and transmitting the data structure to an autonomous vehicle for controlling the autonomous vehicle traversing through the road intersection based at least in part on a cost determined based on the data structure.

B: The system of paragraph A, the operations further comprising: determining, based at least in part on the map data, a third route through the road intersection; determining an additional number of times the first route intersects the third route; determining, based at least in part on the additional number of times and the traffic annotation data, an additional relative priority between the first route and the third route; and storing, in the data structure, an additional association between the first route, the third route, the traffic annotation data, and the additional relative priority.

C: The system of paragraph A or B, wherein the autonomous vehicle is controlled to traverse through the road intersection based at least in part on: determining a vehicle route to traverse through the road intersection; receiving sensor data representing an object approaching the road intersection; determining, based at least in part on the sensor data, an object route; determining, based at least in part on the object route and the vehicle route, an object route priority; determining, based at least in part on the object route priority, the cost; and controlling the autonomous vehicle based at least in part on the cost.

D: The system of any of paragraphs A-C, wherein determining the relative priority comprises determining that the inbound traffic lane is devoid of at least one of a traffic light, a stop sign, a yield sign or a stop line, and wherein a first priority associated with the first route is higher than or equal to a second priority associated with the second route.

E: The system of any of paragraphs A-D, wherein the traffic annotation data comprises at least one of: a traffic light; a stop sign; a yield sign; or a stop line.

F: One or more non-transitory computer-readable media storing computer-executable instructions that, when executed, cause one or more processors to perform operations comprising: receiving map data representing an intersection in an environment, wherein the intersection comprises an inbound lane and an outbound lane; determining, based at least in part on the inbound lane and the outbound lane, a first route through the intersection, the first route associated with a first priority; determining, based on the map data, a second route through the intersection; determining a number of times that the second route intersects the first route; determining, based at least in part on the number of times, a second priority associated with the second route; and storing, in a data structure, an association between the first route, the second route, the first priority, and the second priority.

G: The one or more non-transitory computer-readable media of paragraph F, wherein the map data further comprises traffic annotation data comprising of at least one of: a traffic light, a stop sign, a yield sign, or a stop line.

H: The one or more non-transitory computer-readable media of paragraph F or G, wherein determining the first priority comprises determining that the inbound lane is devoid of at least one of a traffic light, a stop sign, a yield sign or a stop line, and wherein the first priority is higher than or equal to the second priority.

I: The one or more non-transitory computer-readable media of paragraph G, wherein the inbound lane is a first inbound lane and wherein the intersection further comprises a second inbound lane, the operations further comprising: determining, based at least in part on the second inbound lane, a third route associated with a third priority based at least in part on the second inbound lane being associated with at least one of: a traffic light; a stop sign; a yield sign; or a stop line; and determining, based at least on the first inbound lane being devoid of at least one of the traffic light, the stop sign, the yield sign, or the stop line and the second inbound lane being associated with the traffic light, the stop sign, the yield sign, or the stop line, that the first priority is higher than the third priority.

J: The one or more non-transitory computer-readable media of any of paragraphs F-I, wherein the inbound lane is substantially parallel to the outbound lane, wherein a first vehicle enters the intersection using the inbound lane in a first direction and a second vehicle exits the intersection using the outbound lane in a second direction opposite the first direction.

K: The one or more non-transitory computer-readable media of any of paragraphs F-J, wherein the data structure further comprises a plurality of entries, wherein an entry of the plurality of entries comprises a pairwise combination of two routes and associated priorities.

L: The one or more non-transitory computer-readable media of paragraph G, the operations further comprising transmitting the data structure to an autonomous vehicle configured to be controlled based at least in part on the data structure, wherein the autonomous vehicle is controlled to traverse through the intersection based on: determining a vehicle route to traverse through the intersection; receiving sensor data representing an object approaching the intersection; determining, based at least in part on the sensor data, an object route; determining, based at least in part on the object route and the vehicle route, an object route priority; determining, based at least in part on the object route priority, a cost; and controlling the autonomous vehicle based at least in part on the cost.

M: The one or more non-transitory computer-readable media of any of paragraphs F-L, the operations further comprising: determining, based on the map data, a third route through the intersection; determining a second number of times that that the third route intersects the first route; determining, based at least in part on the second number of times, a third priority associated with the third route; and storing, in the data structure, an additional association between the first route, the second route, the third route, the first priority, the second priority, and the third priority.

N: The one or more non-transitory computer-readable media of paragraph M, wherein the number of times is a first number of times and the first number of times is less than the second number of times, the operations further comprising: determining, based on the first number of times being less than the second number of times, that the second priority is higher than the third priority.

O: The one or more non-transitory computer-readable media of any of paragraphs F-N, wherein the intersection further comprises a bike lane, the operations comprising: determining a fourth route through the intersection associated with the bike lane, the fourth route associated with a fourth priority is higher than the first priority and the second priority.

P: A method comprising: receiving map data representing an intersection in an environment, wherein the intersection comprises an inbound lane and an outbound lane; determining, based at least in part on the inbound lane and the outbound lane, a first route through the intersection, the first route associated with a first priority; determining, based on the map data, a second route through the intersection; determining a number of times that the second route intersects the first route; determining, based at least in part on the number of times, a second priority associated with the second route; and storing, in a data structure, an association between the first route, the second route, the first priority, and the second priority.

Q: The method of paragraph P, wherein the map data further comprises traffic annotation data comprising of at least one of: a traffic light, a stop sign, a yield sign, or a stop line.

R: The method of paragraph Q, further comprising: transmitting the data structure to an autonomous vehicle configured to be controlled based at least in part on the data structure, wherein the autonomous vehicle is controlled to traverse through the intersection based on: determining a vehicle route to traverse through the intersection; receiving sensor data representing an object approaching the intersection; determining, based at least in part on the sensor data, an object route; determining, based at least in part on the object route and the vehicle route, an object route priority; determining, based at least in part on the object route priority, a cost; and controlling the autonomous vehicle based at least in part on the cost.

S: The method of any of paragraphs P-R, further comprising: determining, based on the map data, a third route through the intersection; determining a second number of times that that the third route intersects the first route; determining, based at least in part on the second number of times, a third priority associated with the third route; and storing, in the data structure, an additional association between the first route, the second route, the third route, the first priority, the second priority, and the third priority.

T: The method of paragraph S, further comprising: determining, based on the map data, a third route through the intersection; determining a second number of times that that the third route intersects the first route; determining, based at least in part on the second number of times, a third priority associated with the third route; and storing, in the data structure, an additional association between the first route, the second route, the third route, the first priority, the second priority, and the third priority.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
   one or more processors; and
   one or more non-transitory computer-readable media storing computer-executable instructions that, when executed, cause the one or more processors to perform operations comprising:
   receiving map data representing a road intersection in an environment having an inbound traffic lane and an outbound traffic lane, the map data comprising traffic annotation data;
   determining, based at least in part on the map data, a first route and a second route through the road intersection;
   determining a number of times that the second route intersects the first route;
   determining, based at least in part on the number of times and the traffic annotation data, a relative priority between the first and second routes;
   storing, in a data structure, an association between the first route, the second route, the traffic annotation data, and the relative priority; and
   transmitting the data structure to an autonomous vehicle for controlling the autonomous vehicle traversing through the road intersection based at least in part on a cost determined based on the data structure, wherein controlling the autonomous vehicle comprises:
   determining, by the autonomous vehicle and based on the cost, a trajectory through the road intersection; and
   controlling autonomously, based on the trajectory, the autonomous vehicle through the road intersection.

2. The system of claim 1, the operations further comprising:
   determining, based at least in part on the map data, a third route through the road intersection;
   determining an additional number of times the first route intersects the third route;
   determining, based at least in part on the additional number of times and the traffic annotation data, an additional relative priority between the first route and the third route; and
   storing, in the data structure, an additional association between the first route, the third route, the traffic annotation data, and the additional relative priority.

3. The system of claim 1, wherein the autonomous vehicle is controlled to traverse through the road intersection based at least in part on:
   determining a vehicle route to traverse through the road intersection;
   receiving sensor data representing an object approaching the road intersection;
   determining, based at least in part on the sensor data, an object route;
   determining, based at least in part on the object route and the vehicle route, an object route priority;

determining, based at least in part on the object route priority, the cost; and controlling the autonomous vehicle based at least in part on the cost.

4. The system of claim 1, wherein determining the relative priority comprises determining that the inbound traffic lane is devoid of at least one of a traffic light, a stop sign, a yield sign or a stop line, and wherein a first priority associated with the first route is higher than or equal to a second priority associated with the second route.

5. The system of claim 1, wherein the traffic annotation data comprises at least one of:
- a traffic light;
- a stop sign;
- a yield sign; or
- a stop line.

6. One or more non-transitory computer-readable media storing computer-executable instructions that, when executed, cause one or more processors to perform operations comprising:
- receiving map data representing an intersection in an environment, wherein the intersection comprises an inbound lane and an outbound lane;
- determining, based at least in part on the inbound lane and the outbound lane, a first route through the intersection, the first route associated with a first priority;
- determining, based on the map data, a second route through the intersection;
- determining a number of times that the second route intersects the first route;
- determining, based at least in part on the number of times, a second priority associated with the second route;
- storing, in a data structure, an association between the first route, the second route, the first priority, and the second priority; and
- transmitting the data structure to a vehicle for controlling the vehicle traversing through the intersection based at least in part on a cost determined based on the data structure, wherein controlling the vehicle comprises:
  - determining, by the vehicle and based on the cost, a trajectory through the intersection; and
  - controlling autonomously, based on the trajectory, the vehicle through the intersection.

7. The one or more non-transitory computer-readable media of claim 6, wherein the map data further comprises traffic annotation data comprising of at least one of:
- a traffic light,
- a stop sign,
- a yield sign, or
- a stop line.

8. The one or more non-transitory computer-readable media of claim 6, wherein determining the first priority comprises determining that the inbound lane is devoid of at least one of a traffic light, a stop sign, a yield sign or a stop line, and wherein the first priority is higher than or equal to the second priority.

9. The one or more non-transitory computer-readable media of claim 7, wherein the inbound lane is a first inbound lane and wherein the intersection further comprises a second inbound lane, the operations further comprising:
- determining, based at least in part on the second inbound lane, a third route associated with a third priority based at least in part on the second inbound lane being associated with at least one of:
  - a traffic light;
  - a stop sign;
  - a yield sign; or
  - a stop line; and
- determining, based at least on the first inbound lane being devoid of at least one of the traffic light, the stop sign, the yield sign, or the stop line and the second inbound lane being associated with the traffic light, the stop sign, the yield sign, or the stop line, that the first priority is higher than the third priority.

10. The one or more non-transitory computer-readable media of claim 6, wherein the inbound lane is substantially parallel to the outbound lane, wherein a first vehicle enters the intersection using the inbound lane in a first direction and a second vehicle exits the intersection using the outbound lane in a second direction opposite the first direction.

11. The one or more non-transitory computer-readable media of claim 6, wherein the data structure further comprises a plurality of entries, wherein an entry of the plurality of entries comprises a pairwise combination of two routes and associated priorities.

12. The one or more non-transitory computer-readable media of claim 7, wherein the autonomous vehicle is controlled to traverse through the intersection based on:
- determining a vehicle route to traverse through the intersection;
- receiving sensor data representing an object approaching the intersection;
- determining, based at least in part on the sensor data, an object route;
- determining, based at least in part on the object route and the vehicle route, an object route priority;
- determining, based at least in part on the object route priority, a cost; and
- controlling the autonomous vehicle based at least in part on the cost.

13. The one or more non-transitory computer-readable media of claim 6, the operations further comprising:
- determining, based on the map data, a third route through the intersection;
- determining a second number of times that that the third route intersects the first route;
- determining, based at least in part on the second number of times, a third priority associated with the third route; and
- storing, in the data structure, an additional association between the first route, the second route, the third route, the first priority, the second priority, and the third priority.

14. The one or more non-transitory computer-readable media of claim 13, wherein the number of times is a first number of times and the first number of times is less than the second number of times, the operations further comprising:
- determining, based on the first number of times being less than the second number of times, that the second priority is higher than the third priority.

15. The one or more non-transitory computer-readable media of claim 6, wherein the intersection further comprises a bike lane, the operations comprising:
- determining a fourth route through the intersection associated with the bike lane, the fourth route associated with a fourth priority is higher than the first priority and the second priority.

16. A method comprising:
- receiving map data representing an intersection in an environment, wherein the intersection comprises an inbound lane and an outbound lane;

determining, based at least in part on the inbound lane and the outbound lane, a first route through the intersection, the first route associated with a first priority;

determining, based on the map data, a second route through the intersection;

determining a number of times that the second route intersects the first route;

determining, based at least in part on the number of times, a second priority associated with the second route;

storing, in a data structure, an association between the first route, the second route, the first priority, and the second priority; and transmitting the data structure to a vehicle for controlling the vehicle traversing through the intersection based at least in part on a cost determined based on the data structure, wherein controlling the vehicle comprises:

determining, by the vehicle and based on the cost, a trajectory through the intersection; and controlling autonomously, based on the trajectory, the vehicle through the intersection.

17. The method of claim 16, wherein the map data further comprises traffic annotation data comprising of at least one of:

a traffic light, a stop sign, a yield sign, or a stop line.

18. The method of claim 17, further comprising:

wherein the autonomous vehicle is controlled to traverse through the intersection based on:

determining a vehicle route to traverse through the intersection;

receiving sensor data representing an object approaching the intersection;

determining, based at least in part on the sensor data, an object route;

determining, based at least in part on the object route and the vehicle route, an object route priority;

determining, based at least in part on the object route priority, a cost; and controlling the autonomous vehicle based at least in part on the cost.

19. The method of claim 16, further comprising:

determining, based on the map data, a third route through the intersection;

determining a second number of times that that the third route intersects the first route;

determining, based at least in part on the second number of times, a third priority associated with the third route; and storing, in the data structure, an additional association between the first route, the second route, the third route, the first priority, the second priority, and the third priority.

20. The method of claim 19, further comprising:

determining, based on the map data, a third route through the intersection;

determining a second number of times that that the third route intersects the first route;

determining, based at least in part on the second number of times, a third priority associated with the third route; and storing, in the data structure, an additional association between the first route, the second route, the third route, the first priority, the second priority, and the third priority.

\* \* \* \* \*